Patented Oct. 2, 1945

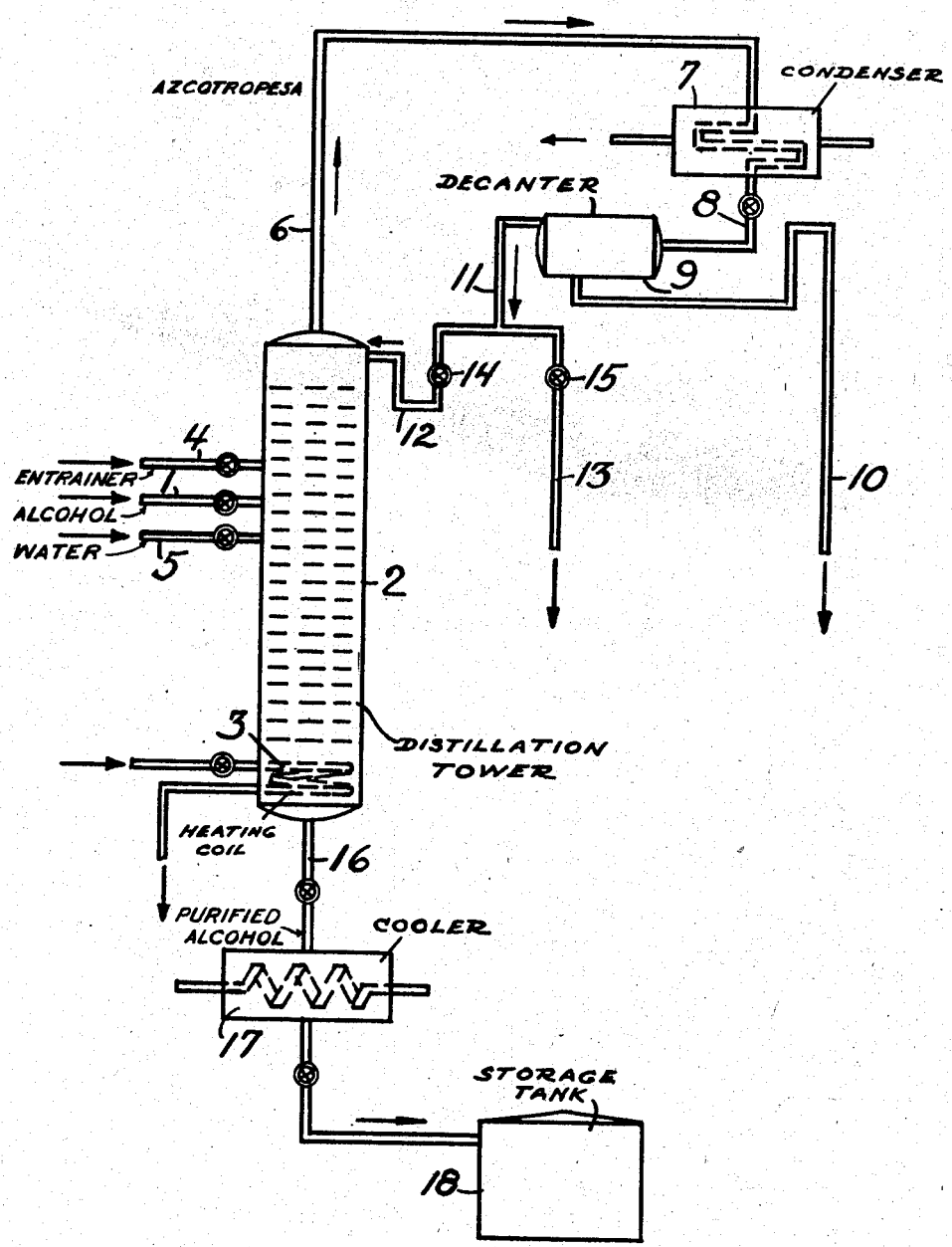

2,386,058

UNITED STATES PATENT OFFICE 2,386,058

PURIFICATION OF ORGANIC LIQUIDS

John A. Patterson, Westfield, and Rudolph J. Ozol, Elizabeth, N. J., assignors to Standard Oil Development Company, a corporation of Delaware Application August 1, 1941, Serial No. 404,990

2 Claims. (Cl. 202—42)

This invention relates to the purification of organic liquids which contain impurities normally difficult to remove by distillation. The invention relates particularly to the purification of the $C_2$ to $C_4$ alcohols prepared from olefins by treatment with sulfuric acid.

The invention is concerned with a method which, from one point of view, is a modification of the process usually employed for dehydrating alcohols by azeotropic means. In its application to the purification of alcohols, the process of the invention insures that the final impurity removed from the alcohol in the dehydrating column is water instead of entrainer or similarly boiling organic compounds. By the method of the invention, contamination of the final product is almost completely avoided. In its application to the alcohols, the process of the invention is to add to the impure alcohol a second liquid which is capable of forming with the water content of the crude supply a ternary azeotropic mixture, then to distil the resultant mixture in the presence of water in slight excess of that required to form the ternary azeotrope of the alcohol, entrainer and water and finally to separate from the substantially pure alcohol the final traces of water. The process can be carried out most effectively on the continuous basis employing a fractionating column. The method is not restricted however to continuous operation but may be satisfactorily carried out in batch treatment.

The essential features of the process of the invention are brought out in the following description of the adaptation of the process to the refining of secondary butyl alcohol as obtained from the hydrolysate of the reaction mixture of sulfuric acid and the normal butylenes. The process applied to the crude secondary alcohol is, however, general and applicable to the purification of any organic liquid which contains impurities normally difficult to remove by distillation. Any organic liquid containing such type impurities may be similarly purified to equal advantage when obvious changes in operating conditions are made to suit the particular physical characteristics of the crude supply. Reference is made in the description to the accompanying drawing which is a diagram of one form of an apparatus for practising the invention.

In the drawing, numeral 1 designates the feed line through which the supply of crude secondary butyl alcohol is supplied. This stream is obtained from a distillation unit to which the hydrolysate of the absorption of the butylenes in sulfuric acid is supplied. The feed stock through line 1 normally contains in addition to the alcohol about 10% to 18% of water and small quantities of organic impurities having boiling points under the conditions of treatment from about that of the binary constant boiling mixture of the secondary butyl alcohol and water to about the boiling point of the secondary butyl alcohol. The significance of these impurities is indicated by the following facts: 1, water and secondary butyl alcohol form a binary constant boiling mixture of lower boiling point (87.3° C.) than that of secondary butyl alcohol (99.8° C.), and 2, many of the organic impurities of low boiling point form, with water and secondary butyl alcohol, diphase ternary azeotropes which boil between about 80° C. and 85° C. In general the process of the invention is to remove such type impurities from organic liquids in a relatively simple and convenient manner and at the minimum cost and loss of organic liquid.

The crude secondary butyl alcohol of such composition is supplied to the distillation tower 2. The distillation tower may be any form of distillation column of customary design fitted with contact devices such as packing or plates, but it is usually of the bubble plate type with plates and heating means as indicated in the drawing by the numeral 3. The crude alcohol is supplied to about the middle of the tower. Above the point of introduction of the alcohol supply, namely, through line 4, is introduced a quantity of entrainer compound. Diisobutylene is taken as an example of an entrainer compound in this specific illustration, but any entrainer compound may be used and particularly a hydrocarbon entrainer compound of very limited solubility. The entrainer compound is added in an amount to combine with practically all the water in the crude alcohol so as to form a diphase ternary azeotrope. The ternary azetrope in the specific illustration consists of water, secondary butyl alcohol and diisobutylene, boiling at 80.2° C. Through line 5, that is, below the point of introduction of the alcohol feed supply, there is introduced in the initial stages of operation a controlled amount of water. The introduction of small quantities of water below the feed supply insures that the lower part of the column functions to remove water from the alcohol rather than entrainer from the alcohol or traces of similarly boiling impurities. In the case of secondary butyl alcohol the low boiling impurities are hydrocarbons produced in small quantities as by-products in the treatment of the n-butylenes with sulfuric acid and also secondary butyl ethers, which forms with the alcohol and water a constant boiling mixture of lower boiling point than the alcohol.

While water is added through line 5 in the case of the purification of secondary butyl alcohol the method of the invention contemplates the addition of many other chemically stable liquids. One of the main characteristics of an applicable liquid added through line 5 is that the liquid must be readily separable from the main body of the organic liquid by distillation, that is, from the liquid itself and the binary and ternary constant boiling mixture hereinafter considered. Also, the added liquid must have the property of forming with the organic liquid to be purified and the impurities normally difficult to remove therefrom by distillation, ternary constant boiling mixtures having boiling points substantially lower than those of the organic liquid to be purified and the constant boiling mixture formed therewith and the impurities. The amount in which the liquid is added through line 5 is such as to be in excess of that required to form the ternary constant boiling mixture with the organic liquid and the impurities present in the system.

Taken overhead from column 2 through line 6, is a mixture of azeotropes. In the case of the specific illustration of the purification of secondary butyl alcohol, the overhead consists of azeotropes containing largely the ternary azeotrope of secondary butyl alcohol, water and di-isobutylene and, in smaller quantities, azeotropes formed with some of the organic impurities, namely, secondary butyl ether and the hydrocarbon deterioration products of the treatment of butylenes with sulfuric acid. These impurities form with water and the alcohol and among themselves ternary and binary azeotropes of boiling point about that of the main azeotrope of the alcohol, water and di-isobutylene.

The overhead distillate is condensed in the vessel 7 and passed through line 8 to the decanter 9. The condensate is allowed to stratify in the decanter 9 and the upper layer withdrawn through line 11 while the lower layer is removed through line 10. The upper layer is separated into two parts, the proportion being regulated by the valves 14 and 15 so that adequate reflux is maintained in column 2. The proportion of the upper layer used as entrainer is preferably passed through line 12 to the top of the column and is controlled in amount so that a small quantity of water remains in the alcohol after the formation of the ternary azeotropic mixture. This manner of operation permits the lower part of the column to function to remove the binary mixture of alcohol and water from the alcohol. When this control is exerted upon the reflux the supply of water through line 5 is cut off. The excess of upper layer from the decanter 9 is withdrawn from the system through line 13 for separate recovery of its alcohol and entrainer contents.

The anhydrous bottoms from column 2 are withdrawn through line 16 passed through cooler 17 and thus to storage 18. The lower layer from the decanter 9 is passed to a second distillation system for concentration and removal of the alcohol and entrainer compound. This second distillation system may conveniently be that from which the feed supply to column 2 is obtained so that in this manner the alcohol and entrainer content of the aqueous layer is recovered and returned to the main distillation system in the feed through line 1.

The following table shows the composition of the various streams. The numbers designating the stream correspond to the numbers on the accompanying drawing.

| Stream | Vol/100 vol feed | Volume per cent | | | | |
|---|---|---|---|---|---|---|
| | | Water | Ether | "Dimer" | Alcohol | High boiling impurities |
| Feed (1) | 100.0 | 16.1 | 5.1 | 8.6 | 68.7 | 1.5 |
| Distillate (8) | 138.5 | 16.5 | 19.4 | 32.3 | 31.8 | 0.0 |
| Upper layer: | | | | | | |
| Reflux (12) | 99.5 | | | | | |
| Withdrawn (13) | 22.8 | 4.0 | 22.5 | 37.5 | 36.0 | 0.0 |
| Total (11) | 122.3 | | | | | |
| Lower layer (10) | 16.2 | 93.6 | 0.3 | 0.4 | 5.7 | 0.0 |
| Bottoms (16) | 61.0 | 0.0 | 0.0 | 0.0 | 97.5 | 2.5 |

The method of the invention may be operated in any one of three ways. Ordinarily, when secondary butyl alcohol is dehydrated by batch operations there is added to the mixture an amount of entrainer compound to combine with all the water and to have the amount of the entrainer compound in slight excess. The composite material obtained from several treatments in these operations usually contains small traces of the entrainer compounds. The removal of these traces of entrainer compound is extremely difficult because the boiling point of the constant boiling mixture of secondary butyl alcohol and entrainer compound is usually close to that of the alcohol. Furthermore, in the case of secondary butyl alcohol, the most efficient entrainer compounds are those which form binary constant boiling mixtures with the alcohol having boiling points near to that of the alcohol. The process of the invention applicable to this mixture is to add to the relatively pure alcohol, water in an amount between 2 and 3% by weight of the alcohol and to distil the resultant mixture. In this way there is first obtained as distillate the ternary azeotrope of the water, alcohol and entrainer and then the excess water is removed as the binary composition. The second alternative procedure according to the invention, is to add a controlled amount of water to the column in continuous operation at a point below the introduction of the entrainer compound resulting from the ternary azeotropic mixture in order that the lower part of the column may function to remove the binary alcohol water azeotropic mixture from the pure alcohol. The third alternative procedure is applicable only to continuous operation and is effected by returning the entrainer layer to the top plate of the column as reflux and controlling the amount of the entrainer in the system so that a small amount of water remains in the alcohol after the formation of the ternary azeotropic mixture so that the lower part of the column then functions in the same manner as that described in the second procedure. This latter method is the preferred procedure for carrying out the invention, since none of the major impurity, water in this case, is added to the system in order to facilitate the elimination of other type impurities. This procedure is therefore particularly efficacious in avoiding the removal of such additional quantities of the major impurity.

The method of the invention is an advance in the art of purifying organic liquids. In the prior art the traces of impurities of boiling point close to that of the liquid have not been generally removed because their removal by a ready, simple and inexpensive procedure was not known. In cases where the impurities had to be removed, resort was made to such costly procedures as solvent extraction and chemical treatment. The method is unique in providing a convenient and easy means for removing impurities from organic liquids which are normally difficult to remove by the simple procedure of distillation. Also the method of the invention is effected with the minimum of cost and loss of organic liquid.

Furthermore when the purification treatment includes azeotropic dehydration the invention permits a wider selection of suitable entrainer compounds than hithertofore considered advantageous since no direct separation has to be made between the entrainer compound and the organic liquid. Entrainer compounds in these systems may therefore be chosen with little regard to the boiling points of the constant boiling mixtures formed with the organic liquid except that of the ternary azeotropes formed with water, so long as those ternary compositions have boiling points substantially lower than those of the organic liquid and the constant boiling mixtures formed therewith and the other impurities. With these limitations, the boiling points of the other constant boiling mixtures may be close, either above or below, that of the organic liquid without being disadvantageous.

The method of the invention is applicable to the purification of such organic liquids as the alcohols, the ketones, esters, chlorohydrins and amines with which are generally associated in crude supplies impurities having boiling points close to those of the main constituents. The method, however, is particularly applicable to the lower monohydric alcohols especially to the alcohols prepared by treating olefins with sulfuric acid and containing as a result hydrocarbon impurities having boiling points close to those of the alcohols and which also have properties which characterize them as effective hydrocarbon entrainer materials.

It will be obvious that many modifications can be made in the procedure as previously described for the method of the invention but such modifications are considered as being comprehended by the above disclosure.

What is claimed is:

1. The method of purifying secondary butyl alcohol containing as impurities water and secondary butyl ether, which comprises distilling the mixture in a fractionating column, introducing the feed mixture into a central section of the column, adding additional water to the column at a point below the alcohol feed to adjust the water content to more than sufficient to form a ternary azeotrope with the alcohol and ether and to an amount which will be removed from the lower section of the column from the feed to leave a non-aqueous residue of the alcohol, condensing the distillate and decanting it into an aqueous and a non-aqueous layer, and returning a portion of the non-aqueous layer to the top of the column as reflux.

2. The method of purifying a $C_2$ to $C_4$ alcohol prepared by the treatment of an olefin with sulfuric acid and which contains as impurities water and in less amounts essentially organic compounds which form diphase ternary constant boiling mixtures with the alcohol and water and which are normally difficult to remove by distillation from the alcohol, which comprises distilling the mixture in a fractionating column, introducing the feed mixture into a central section of the column, adding additional water to the column at a point below the alcohol feed to adjust the water content to more than sufficient to form a ternary azeotrope with the alcohol and organic compound and to an amount which will be removed from the section of the column from the feed to leave a non-aqueous residue, adding entrainer compound for water above the alcohol feed in amount sufficient to dehydrate the alcohol, condensing the distillate and decanting it into an aqueous and a non-aqueous layer, and returning a portion of the non-aqueous layer to the top of the column as reflux.

JOHN A. PATTERSON.
RUDOLPH J. OZOL.